Patented June 8, 1954

2,680,766

UNITED STATES PATENT OFFICE 2,680,766

METHOD OF INHIBITING CORROSION IN UREA SYNTHESIS REACTORS

Harald W. de Ropp and Henry L. Forbes, Jr., Wilmington, Del., assignors to E. I. du Pont de Nemours & Company, Wilmington, Del., a corporation of Delaware No Drawing. Application March 23, 1951,
Serial No. 217,325

1 Claim. (Cl. 260—555)

This invention relates to a method for manufacturing urea. More particularly, it relates to a method for inhibiting corrosion when manufacturing urea in the presence of equipment constructed of chromium alloy steels.

It has been known for many years that urea can be synthesized by reacting ammonia with carbon dioxide at elevated temperatures and pressures, whereby mixtures, or melts, are obtained containing urea, ammonium carbamate, water and unreacted starting materials. Furthermore, it has been known for many years that the mixtures resulting from this synthesis are extremely corrosive to the materials ordinarily employed in commercial chemical operations. As a result, it has been proposed that special equipment, constructed of lead, silver or other expensive material, be employed when handling these corrosive mixtures. It has also been proposed that chromium alloy steels, such as those known as stainless steels, could be employed for this purpose, provided certain corrosion inhibitors were present.

In the commercial manufacture of urea, it is desirable to be able to employ carbon dioxide which has been derived from a cheap source of carbon, such as coal, coke, natural gas or petroleum. These carbon-containing materials are generally treated with a gas comprising steam in order to produce a mixture of carbon monoxide and hydrogen which is known as "synthesis gas." This carbon monoxide can then be converted into carbon dioxide by any one of several methods, including, for instance, treatment with an additional amount of steam to produce carbon dioxide and more hydrogen. Alternately, a carbonaceous substance such as natural gas may be treated with oxygen, or air enriched with oxygen, to produce "synthesis gas," which in turn is reacted with steam to convert the carbon monoxide to carbon dioxide. The carbon dioxide as produced by any of these processes is separated out and used in the urea synthesis.

It is also desirable, in the commercial manufacture of urea, to be able to operate the plant in close proximity to an ammonia manufacturing plant. In such a case, some or all of the hydrogen which is produced as described above is reacted with nitrogen to give ammonia, which is then used in the urea manufacturing process.

It is an object of this invention to provide a process for manufacturing urea-containing compositions. It is a further object of the invention to provide a process for manufacturing urea-containing compositions in equipment which is constructed at least in part of a chromium alloy steel. A further object of the invention is to provide a process for inhibiting or minimizing corrosion in the manufacture of urea. A still further object is to provide a process for manufacturing urea in which carbon dioxide derived from carbonaceous materials such as coal, coke, natural gas or petroleum may be employed. Other objects of the invention will appear hereinafter.

In accordance with this invention, it has been discovered that a very attractive process for manufacturing urea comprises producing carbon dioxide from steam and a sulfur-containing carbonaceous substance of the class consisting of coal, coke, natural gas and petroleum; effecting a removal of sulfur at a stage prior to the introduction of the carbon dioxide into the urea synthesis step; reacting the thus purified carbon dioxide with ammonia in the presence of less than 10 p. p. m. of oxygen to produce a urea synthesis melt; subjecting said urea synthesis melt to a treatment for the concentration and removal of at least one constituent therefrom, said treatment being carried out in equipment in which a corrosive substance present in said urea synthesis melt comes into contact with equipment constructed of a chromium alloy steel; and introducing into the system, at a point prior to the place where the said corrosive substance comes into contact with the said chromium alloy steel, an amount of copper sufficient to provide a concentration of at least 2 parts per million of copper in excess of the amount of copper required to react with all of the sulfide present to form the compound $Cu_2S$.

According to a preferred embodiment of the invention, the degree of sulfur removal is such that the carbon dioxide employed in the urea synthesis step contains less than 4 p. p. m. of sulfide. According to a particularly preferred embodiment of the invention, the sufide concentration in the supply of carbon dioxide should be so low as to be undetectable, i. e., below about 1 p. p. m. According to another preferred embodiment of the invention, the chromium alloy steel employed in the urea synthesis melt processing equipment is a molybdenum-modified chromium-nickel stainless steel. According to a further preferred feature of the invention, a portion of the hydrogen obtained in producing the carbon dioxide is converted into ammonia, which in turn is employed in the urea synthesis step.

The manufacture of carbon monoxide, and ultimately carbon dioxide, by the reaction of steam with various carbonaceous materials, and/or with the synthesis gas produced from said materials, is well known in the art. These carbonaceous materials ordinarily contain sulfur in varying amounts, and unless steps are taken to remove this sulfur, the carbon dioxide which is produced therefrom will contain appreciable concentrations of sulfide. A number of different sulfur removal processes can be employed satisfactorily in connection with the overall process of the present invention. For example, sulfur compounds can be removed from the "synthesis gas" by liquefaction, by selective absorption, by solvent extraction, by water scrubbing, by chemical means, by catalytic processes, etc. Alternately, part or all of the sulfur compounds may be removed, by similar techniques, from the carbon dioxide which is produced. For instance, arsenic compounds, ethanolamines, water, caustic solutions, and aluminum chloride are among the absorption agents which may be employed. The sulfur compounds can be removed at any desired stage in the process, some or all of them being removed at either the synthesis gas stage or at the carbon dioxide stage.

Fundamentally, the synthesis of urea involves the condensation of two mols of ammonia with one mol of carbon dioxide to give ammonium carbamate, followed by removal of a mol of water therefrom to form urea. Either excess ammonia or excess carbon dioxide may be employed and the reaction may be carried out, if desired, in the presence of an inert diluent such as nitrogen. Insofar as the present invention is concerned, this reaction may be carried out either in a single reaction vessel, or else in a two-stage reactor which is designed for formation of a carbamate-containing composition in a first stage and conversion of carbamate to urea in a second stage. The overall reaction is generally carried out at pressures of from 2000 to 8000 pounds per square inch and at temperatures between 150° and 250° C. to obtain a mixture, or melt, containing considerable quantities of ammonium carbamate and unreacted starting materials in addition to the urea itself. Throughout the specification and claims, when reference is made to the synthesis of urea from ammonia and carbon dioxide, the expression is intended to include as starting materials not only ammonia and carbon dioxide as such, but also their reaction products which are convertible to urea, notably ammonium carbamate and also ammonium carbonate or bicarbonate, as well as combinations of any of these compounds.

Depending on the final products desired, the mixtures, or melts, obtained in the synthesis step may be processed in a wide variety of ways known to the art. Ammonia, which is generally employed in excess of the stoichiometric requirements, may be removed and thereafter recycled to the synthesis step, added to fertilizer compositions, oxidized to nitric acid, or converted to ammonium salts. Ammonium carbamate may be removed and recycled to the synthesis step or employed in fertilizer compositions. The urea itself may be employed in fertilizer compositions along with other ingredients of the melts, or the other ingredients of the melts may be removed as disclosed by De Ropp in U. S. 2,116,881 to provide a concentrated aqueous solution from which urea may be crystallized in pure form. Advantageously, the aqueous urea solutions, prior to crystallization, may be subjected to an additional stripping operation at about atmospheric pressure, using steam or other stripping agents, to recover any ammonia remaining after the carbamate removal, without at the same time using temperatures so high that deamination of the urea occurs. If desired, the urea may be crystallized in the presence of ammonia.

In any of the processes suggested above, the liquid compositions existing in the original synthesis step, and the various intermediate compositions obtained prior to the isolation of the desired end products, are highly corrosive to all kinds of steel. Furthermore, the vapors in contact with these liquids are also highly corrosive to steel. The processes covered by this invention are those in which certain types of steels, namely, the chromium alloy steels, are employed under conditions which render them resistant to the corrosive action of these substances. The advantage of using steels of this type, in place of lead, silver, or similar materials of construction, stems not only from the saving in initial investment, but, also from the greatly increased strength of the steel in withstanding the high pressures employed and the consequent simplification in the design of apparatus. It is particularly advantageous to be able to employ stainless steels in the construction of pipes, valves, stills, evaporators, absorbers, coolers, centrifuges, and the like, which may be involved in the separation of the desired constituents from the urea synthesis melts, or in the handling, storage or distribution of any of these corrosive mixtures.

Many types of chromium alloy steels are known in the art and commercially available. Particularly useful are the so-called stainless steels which contain nickel as an added element. For example, alloy steels containing 18% chromium and 8% nickel, or 24% chromium and 12% nickel, are highly resistant to the corrosive action of urea synthesis melts provided the teachings of the present invention are followed. Advantageously, these stainless steels may be modified by including in the alloy one or more modifiers such as manganese, silicon, molybdenum, tungsten, columbium and the like. According to a preferred feature of the invention, the chromium alloy steel which is employed in the construction of the urea processing equipment is a molybdenum-modified chromium-nickel stainless steel, such as that known as type 316 stainless steel.

With the removal of certain of the constituents from the urea synthesis melts, the mixtures tend to become relatively less corrosive, especially where the temperature of the mixture is not high, and at such points, it may be possible to employ materials of construction other than chromium alloy steels, i. e., mild steels and the like. It is thus not intended that the entire plant for the processing of these urea synthesis melts must necessarily be constructed of chromium alloy steels, but only those parts thereof coming into contact with the most corrosive mixtures. Preferably, however, chromium alloy steels are used almost exclusively as the material of construction for this processing equipment, and molybdenum-modified chromium alloy steels are used at points where high temperatures are encountered.

Among the factors affecting the amount of copper which must be employed to effectively protect the chromium alloy steels are the temperature and composition of the corrosive substance, its rate of movement, and the particular type of chromium alloy steel which is to be protected. The copper may be introduced into the system in the form of copper metal or in the form of a compound such as the sulfate, nitrate, basic carbonate, formate, acetate, oxide, hydroxide, etc. It is important that at least some of the copper be introduced into the system prior to the point where any corrosive material comes into direct contact with the chromium alloy steel. If desired, the copper may be introduced in portions at several points in the system. In some systems, certain streams may be recycled to a preceding step, in which case a part of the copper requirement may be supplied by the copper contained in the recycled stream.

A critical factor which drastically affects the amount of copper to be employed is the concentration of sulfide present in the various parts of the system. Even though relatively large concentrations of copper are present, they are unavailing to forestall corrosion if the sulfide concentration at any particular point in the system is too great. The copper concentration should be so adjusted that there is present at all times at least a slight excess of copper over the amount required to react with all of the sulfide present to form the compound $Cu_2S$. Under low temperature conditions, for instance, it is satisfactory to employ a concentration of at least 2 parts per million of copper in excess of the amount of copper required to react with all of the sulfide present to form $Cu_2S$, whereas higher relative concentrations of copper will be required under higher temperature conditions which are more conducive to corrosion. The concentration of copper is expressed on a weight basis relative to the total weight of the liquid mixture or melt which contains the copper. At a temperature of 100° C., at least 3 parts per million of copper should be present, while at a temperature of 200° C., about 300 or 400 parts per million of copper should be employed.

In order to render feasible this use of copper as a corrosion inhibitor, it is important not only that the sulfur content of the carbon dioxide be kept down to a low level, but also that the sulfur content of the other reactants and of any recycled materials going into the urea synthesis system be kept down to a minimum, so that the requisite concentration of available copper may be maintained.

It is also critical that the oxygen content of all the substances going into the urea synthesis step be kept down to a minimum, not only because the presence of oxygen results in the formation of undesired by-products but also because of the corrosive action of oxygen on certain of the materials of construction most suitable for use in the construction of the converter. In the process of this invention, it has been found that the oxygen content of the substances present in the urea synthesis converter should not exceed 10 p. p. m. In order to achieve this objective, special treatment of the carbon dioxide and/or the ammonia may be required for removal of oxygen, as, for instance, by liquefaction, use of a selective solvent, catalytic treatment, selective absorption and the like. Preferably the carbon dioxide employed should contain less than 10 p. p. m. of oxygen, in which case the reaction will generally be carried out in the presence of less than 4 p. p. m. of oxygen.

The feature whereby the process of the present invention is operated in conjunction with an ammonia synthesis plant results in important advantages, since the hydrogen obtained along with the carbon dioxide can thus be converted, ultimately, into urea. Secondly, the gases produced from the original carbonaceous material can be treated conveniently for the removal of sulfur compounds, thus eliminating the need for any subsequent sulfur removal from the carbon dioxide. Thirdly, the products from the two plants are available at one location for the manufacture of urea- and ammonia-containing fertilizer compositions. And fourthly, the cost of the ammonia employed in the urea synthesis step is kept down to a minimum.

The aqueous solutions of urea, such as are obtained after the removal of substantially all the other substances produced in the synthesis step, still contain some of the copper corrosion inhibitor. It has been found that this copper may be removed advantageously by treating the solution with hydrogen sulfide to precipitate part, or all, of the copper as the sulfide, which can then be filtered off. Upon crystallization of the urea, an essentially copper-free product is thus obtained which has superior color and which is of greater usefulness in preparing resins than is urea containing small amounts of copper.

Since many modifications of the present invention will occur to those skilled in the art, it is not intended that the invention should be limited in any way other than by the following claim.

We claim:

In a process for the manufacture of urea in which carbon dioxide produced from steam and a sulfur-containing carbonaceous substance is reacted with ammonia to produce a urea synthesis melt and the urea synthesis melt is subjected to a treatment for the concentration of at least one constituent thereof, said treatment being carried out in equipment in which a corrosive substance in said urea synthesis melt comes into contact with equipment constructed of a chromium alloy steel, the steps comprising effecting a removal of sulfur from said carbon dioxide prior to the reaction thereof with ammonia to such an extent that the carbon dioxide will contain less than 4 p. p. m. of sulfide, reacting the carbon dioxide with ammonia in the presence of less than 10 p. p. m. of oxygen, and introducing into said mass at a point prior to the place where the said corrosive substance comes into contact with said chromium alloy steel an amount of copper sufficient to produce a concentration of at least 2 p. p. m. of copper in excess of the amount of copper required to react with all of the sulfide present to form the compound $Cu_2S$.

References Cited in the file of this patent

UNITED STATES PATENTS

| Number | Name | Date |
|---|---|---|
| 1,730,208 | Hetherington et al. | Oct. 1, 1929 |
| 1,986,973 | Hetherington et al. | Jan. 8, 1935 |
| 2,046,827 | Lawrence et al. | July 7, 1936 |
| 2,129,689 | Hetherington | Sept. 13, 1938 |